United States Patent [19]

Beitzer

[11] Patent Number: 4,536,967
[45] Date of Patent: Aug. 27, 1985

[54] TILT SENSOR AND METHOD OF ASSEMBLY

[75] Inventor: George W. Beitzer, Huntington, N.Y.
[73] Assignee: Spectron Glass and Electronics, Incorporated, Uniondale, N.Y.
[21] Appl. No.: 569,399
[22] Filed: Jan. 9, 1984
[51] Int. Cl.³ .......................... G01C 9/06; G01C 9/28
[52] U.S. Cl. ......................................... 33/366; 33/379
[58] Field of Search ................... 33/366, 379; 340/689

[56] References Cited

U.S. PATENT DOCUMENTS

| | | | |
|---|---|---|---|
| 2,713,727 | 7/1955 | Balsam | 33/366 |
| 4,110,609 | 8/1978 | Beer | 33/366 |
| 4,312,131 | 1/1982 | Scriffignana et al. | 33/366 |

FOREIGN PATENT DOCUMENTS

| | | | |
|---|---|---|---|
| 2847128 | 5/1980 | Fed. Rep. of Germany | 33/366 |
| 756199 | 8/1980 | U.S.S.R. | 33/366 |
| 767507 | 9/1980 | U.S.S.R. | 33/366 |

Primary Examiner—Richard R. Stearns
Attorney, Agent, or Firm—Stephen E. Feldman; Nikolay Parada

[57] ABSTRACT

An electrolytic type level sensor is secured atop spaced posts of a ceramic pedestal by applying epoxy only about the periphery of each post where it contacts the glass container of the level sensor and so that the glass container otherwise rests upon the posts. A thermal shunt of flexible braided copper is disposed about the glass container and is urged snuggly thereagainst by heat shrinking a plastic tube about the thermal shunt. The ceramic pedestal is received in an opening of a mounting plate and is urged by a spring pin against a "v" block type seat formed in the opening to establish points-of-contact therebetween. Epoxy is applied between the pedestal and opening to secure same together except at said points-of-contact. Plastic insulation is disposed about the sensor and pedestal and otherwise fills spaces in a housing for same and attached to said mounting plate.

18 Claims, 5 Drawing Figures

TILT SENSOR AND METHOD OF ASSEMBLY

BACKGROND OF THE INVENTION-FIELD OF APPLICATION

This invention relates to position sensors; and more particularly to devices for sensing and indicating the inclination of a surface with respect to the true horizontal, and the method of assembling and fabricating same.

BACKGROUND OF THE INVENTION-DESCRIPTION OF THE PRIOR ART

Quite often the equipment, mechanisms, processes, and vehicles (earthbound or for use in space) required by our complex society dictate the necessity for maintaining a positional alignment between the equipment, or a mechanism thereof, and a given reference. The given reference may well be the true horizontal; and the positional alignment is usually one of angular position of the equipment, or a part of its mechanism, with respect to the true horizontal.

Equipment and mechanisms for sensing the angular position of a body with respect to the true horizontal are readily available. Many of such provide an electrical signal, indicative of an angular displacement of a body with respect to the horizontal, for subsequent use by servo-type mechanisms to take corrective action that realigns the body to the true horizontal if desired. Some available position sensors utilize a pendulum in conjunction with other components to sense and indicate angular position, such as that shown and described in U.S. Pat. No. 4,163,325 granted on Aug. 7, 1979 to D. Hughes for *Verticality Sensors*. Other position sensors utilize a source of radiation and associated optical elements, such as that shown and described in U.S. Pat. No. 4,159,422 granted on June 26, 1979 to S. Okubo for *Temperature Stable Displacement Sensor With Fine Resolution*. However, such position sensors are cumbersome and bulky and could prove to be unusable in environments where weight, space, response time and similar criteria are essential or critical.

Some available position or tilt sensors utilize a glass vial or tubular container within which an air or gas bubble is disposed in an electrolytic solution and to which suitable electrodes are attached. As the position of the tube in such liquid level devices moves with respect to the horizontal so does the relative position of the bubble and electrolyte with respect to the electrodes. A current passed between electrodes and through the electrolyte provides an indication of the angular position of the container. However, devices such as those shown in: U.S. Pat. No. 2,977,559 granted on Mar. 28, 1961 to A. M. Rosenberg et al for *Low Resistance Electrolytic Tilt Device*; in U.S. Pat. No. 3,114,209 granted on Dec. 17, 1963 to F. B. Foody et al. for *Level Sensor*; and in U.S. Pat. No. 3,299,523 granted on Jan. 24, 1967 to L. N. Lea for *Levels* fail to effectively isolate the electrolyte in the container from the effects ambient temperature and its changes.

It is the change in electrical resistance of the fluid within the container of these liquid levels that is sensed and utilized as the basic indication of change in angular position for these devices. However, the electrical resistance of the fluids utilized for such sensors is also dependent upon the temperature of the fluid. Thus, changes in resistance of the fluid due to changes in temperature will provide a false indication of position if not accounted for. Correcting for such unwanted resistance changes can be cumbersome, expensive, time consuming and render sensors subject to temperature changes unusable for applications where thermal isolation and stability are required.

Still other available sensors seek to provide some degree of isolation from changes in ambient temperature by utilizing insulating blocks for the liquid container as shown and described in U.S. Pat. No. 2,713,727 granted to L. L. Balsam on July 26, 1955 for *Linear Bubble Level Signal Device*; or by placing the liquid container in a container within a container as shown and described in U. S. Pat. No. 4,312,131 granted on Jan. 26, 1982 to P. J. Scriffignans et al. for *Accurate Level Sensor*. But, such sensors also do not provide static and dynamic thermal enviornments for the fluid wherein the fluid temperature remains isothermal (i.e. no temperature gradients within the level).

Available tilt sensors do not readily satisfy the general stability requirements for sensors utilized in devices such as the Sperry Tilt Meter, or in similar applications. Those general stability requirements dictate that the reference or null position should be stable to better than $\frac{1}{4}$ of an arc minute through temperature excursions of + and −50° F. from normal room temperature. This requirement applies to steady state conditions. A rate of change of temperature also applies. The same allowable change must not be exceeded with temperature changing at the rate of 100 degrees/hour.

SUMMARY OF THE INVENTION

It is therefore an object of this invention to provide a new and improved position sensor.

It is another object of this invention to provide a new and improved tilt sensor.

It is a further object of this invention to provide a new and improved electrolytic type tilt sensor.

It is still a further object of this invention to provide a new and improved tilt sensor which is effectively isolated from changes in ambient temperature.

It is yet still a further object of this invention to provide a new and improved tilt sensor which utilizes an electrolytic fluid and wherein the fluid temperature in static and dynamic thermal environments remains substantially isothermal.

It is yet still another object of this invention to provide a new and improved electrolytic type tilt sensor having a stability such that the reference or null position of the sensor is substantially stable to at least one-quarter of an arc minute through temperature excursions of plus and minus fifty degrees F.

It is yet still a further object of this invention to provide a new and improved method of fabricating and assembling a sensor.

It is yet still a further object of this invention to provide a new and improved method of fabricating and assembling a tilt sensor.

It is yet still a further object of this invention to provide a new and improved method of fabricating and assembling an electrolytic tilt sensor.

Other objects, features and advantages of the invention in its details of construction and arrangement of parts will be seen from the above, from the following description of the preferred embodiment when considered with the drawing and from the appended claims.

DESCRIPTION OF THE PREFERRED EMBODIMENT

Figure 1:
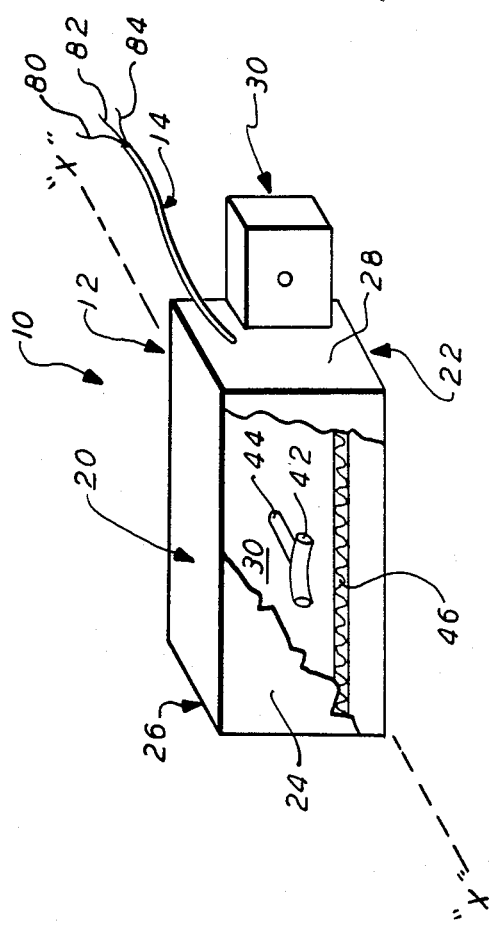
FIG. 1 is a perspective view showing a tilt sensor incorporating the instant invention and which is cut away in part to better show details thereof.

With reference to FIG. 1, there is generally shown at 10 a tilt sensor including a sensor housing 12 suitably mounted such that sensor 10 will sense angular displacement with respect to a particular reference, such as axis x—x, and provide an electrical output indicative of such displacement through electrical conductor 14. Housing 12 includes a top plate or cover 20, a bottom plate 22, a front plate 24, side plates 26, 28, and a rear or back plate 30. Back plate 30 (FIGS. 1 and 2) also serves as a mounting plate for a level sensor 40 encapsulated within a thermal shunt 42 and mounted on a support pedestal 44 that is, in turn mounted to back plate 30. Suitable plastic insulation 46 is disposed within housing 12 and around level sensor 40 to further isolate same from transmission through housing 12 of ambient thermal changes and effects.

Level sensor 40 (FIG. 2) is of the electrolytic type and includes a vial, tube or container 60 fabricated from suitable glass and into a tubular and arcuate or curvilinear configuration and within which a suitable electrolytic fluid is disposed. The quantity of fluid 62 disposed within container 60 is selected so that a bubble 64 is formed within tube 60. Ends 66, 68 of container 60 are suitably sealed to prevent escape of fluid 62. A pair of top electrodes 70, 72 and a bottom electrode 74 are disposed within container 60 and appropriately positioned therewithin. Electrical conductors 80, 82, and 84 extend from electrodes 70, 72 and 74 respectively and are combined to form conductor 14 (FIG. 1). The internal construction of level sensor 40 (i.e. the spacing and arrangement of electrodes 70, 72 and 74) is extremely and precisely symetrical. This is accomplished primarily by positioning bottom electrode 74 precisely half way between top electrodes 70, 72.

Figure 2:
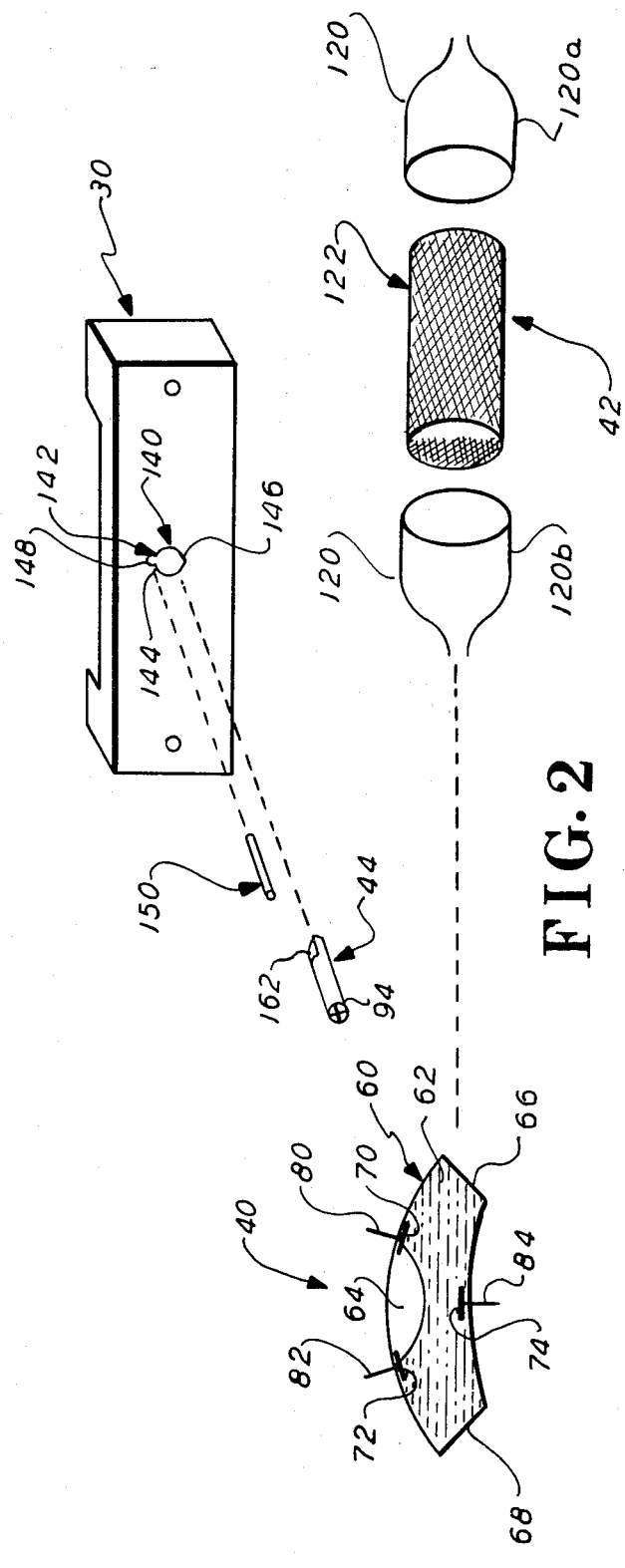
FIG. 2 is an exploded view of the electrolyte container, showing a thermal shunt and pedestal mount therefore, according to the instant invention.
Figure 3:
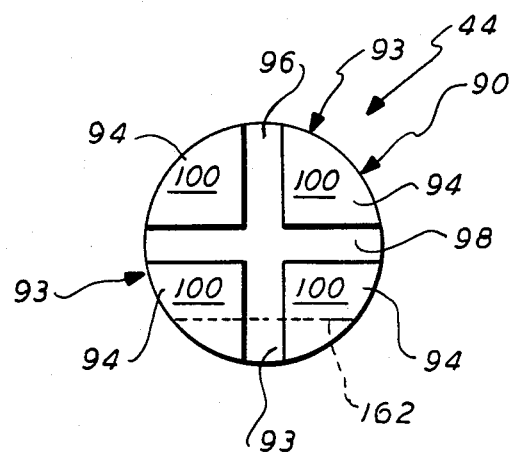
FIG. 3 is a top or plan view of the pedestal mount of FIG. 2.
Figure 4:
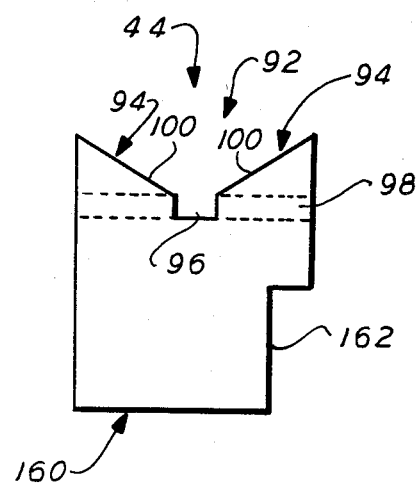
FIG. 4 is an elevational view of the pedestal mount of FIGS. 2 and 3.
Figure 5:
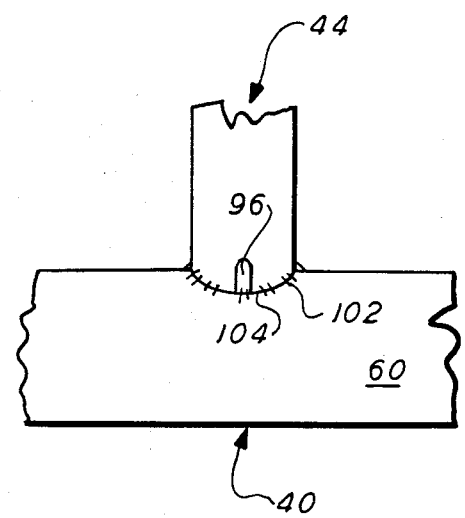
FIG. 5 is a schematic illustration showing how the pedestal mount and electrolyte container are assembled.

Level sensor 40 is secured to and carried by support pedestal 44 (FIGS. 2, 3 and 4). Pedestal 44 is formed from ceramic stock having a cylindrical outer surface of side wall 90. A sensor mounting surface 92 is provided at a first end 93 of pedestal 44 by forming four posts 94 thereon. Posts 94 are disposed continguous with the cylindrical side wall 90 of pedestal 44 but separated from each other by a pair of diametric channels 96, 98 formed into end 93 of pedestal 44. Upper surfaces 100 of posts 94 are each defined by a periphery 102 and are formed thereon either, as planar surfaces disposed at a predetermined angle with respect to a central axis "y" through pedestal 44, or as curved surfaces of predetermined arcuate configuration. The planar angle may, for example, be sixty degrees; while the arcuate configuration may be generated, for example, at a five-sixteenth inch radius. Level sensor 40 is secured to posts 94 of pedestal 44 by a suitable epoxy 104 (FIG. 4)

Positioning and cementing of ceramic pedestal 44 and level sensor 40 is a precision operation. Pedestal 44 is mounted to level sensor 40 at the centerline of container 60 of sensor 40. Epoxy 104 (FIG. 4) of suitable characteristics, is applied about only the periphery 102 of each post 94 where they contact glass container 60. By applying epoxy only about the periphery of posts 94 the ceramic material of pedestal 44 is in direct contact with and supports level sensor 40. As such, pedestal 44 and its attachment to and support of level sensor 40 minimizes thermal stresses to glass container 60 of sensor 40 because the thermal coefficient of expansion of ceramic pedestal 44 is selected as close as possible to that of glass container 60. This slows down the rate that heat is transmitted to glass container 60 and electrolyte 62 therewithin by providing a high thermal impedance.

It is important to note that under changing temperature conditions the primary heat flow path to level sensor 40 is through mounting pedestal 44. By mounting pedestal 44 as described, and on the center line of container 60, equal heating thereof and of electrolyte 62 at each end of container 60 is assured. This is important for transient thermal conditions.

Once level sensor 40 is epoxied to mounting pedestal 44, as described hereinabove, thermal shunt 42 is securely disposed about container 60 of sensor 40 by shrinking a plastic sleeve 120 (FIG. 2) thereabout. Shunt 42 takes the form of a flexible copper braid tube 122 of an internal diameter lightly larger than the outside diameter of container 60 of sensor 40. Copper is, as is well known, one of the best thermal conducting materials available. The low coefficient of thermal expansion of the glass of container 60 relative to the high one of the copper of tube 122 facilitates the desired thermal isolation and stability.

Sleeve 120, of suitable thermosetting plastic that will shrink to a desired degree upon application of heat, is formed as two end caps 120a, 120b, respectively fitted over the ends of container 60 of sensor 40 after it has been secured to pedestal 44. Suitable openings (not shown) may be provided in sleeve 120 to so accommodate pedestal 44. Once unshrunk sleeve 120 is disposed over shunt 42 heat is applied thereto by suitable means (such as a heated current of air from a blower or the like) and sleeve 120 is reduced in diameter to closely fit around shunt 42 and closely fit same around container 60. Intimate contact is thus achieved between shunt 42 and the glass of container 60 and this effects an efficient thermal shunting action. One might consider the coaction of shrink fit sleeve 120 around shunt 42 to hold same against container 60 to be like a low force conformal plastic spring.

The thermal shunt thus provided is the primary contributor in obtaining an isothermal condition for level sensor 40 under both static and dynamic thermal conditions. It, furthermore, accomplishes this without mechanically stressing container 60 and is low in cost. The thermal shunt thus provided effectively makes container 60 and electrolyte 62 therein an isothermal mass.

Mounting pedestal 44 is secured to back plate, or mounting plate 30 by forming an opening 140 (FIG. 2) at a central position in plate 30. Opening 140 is formed with: circular walls 142, 144 that proximate the outside diameter of cylindrical surface 90 of pedestal 44; and a "v" wall section 146. A key type opening 148 is also formed in plate 30 to intersect circular walls 142, 144 and is of a size and configuration to receive a spring pin 150 of conventional configuration.

Securing pedestal 44 to plate 30 is also a critical design feature of tilt sensor 10. It is accomplished by placing a lower end 160 of pedestal 44 into opening 140 so that spring pin 150 applies force to a flat surface 162 formed into cylindrical surface 90 of pedestal 44 proximate lower end 160 thereof. Spring pin 150 thus urges cylindrical surface 90 of pedestal 44 against the "v" wall section 146 of opening 140.

When the combined pedestal 44 level sensor 40 has been aligned with respect to selected reference positions of housing 12 the interface between pedestal 44 and plate 30 is epoxied. The force of spring pin 150 acts as a positive, continuous loading upon pedestal 44 creating points of contact between cylindrical surface 90 thereof and "v" wall section 146 and preventing epoxy from flowing between pedestal 44 and such points of contact when pedestal 44 is being epoxied to plate 30. As such non-symetrical lifting of pedestal 44, potentially due to unequal amounts of epoxy expanding as temperature changes, is avoided. Use of the "v" block type seat 146 for pedestal 44 also maximizes symetrical dimensions relative to mounting references which is important if and as thermal expansion occurs. Symetrical movement within the assembly also maximizes the possibility that only translation of pedestal 44 and level sensor 40 will take place. Non-symetrical movements thereof might result in angular rotation.

It will thus be seen that a novel and improved tilt sensor and method of fabriating and assembling same has been provided; which sensor and method provides a sensor with a high degree of angular stability over large temperature excursions and in turn facilitates the availablity of high accuracy measurements of small angular changes without concern for zero reference shifts. The tilt sensor so fabricated and assembled is relatively immune to temperature changes over a broad temperature range and provides accuracy and stability of angular movement hereinbefore unattainable.

It is understood that although I have shown the preferred form of my invention that various modifications may be made in the details thereof without departing from the spirit as comprehended by the following claims.

What is claimed is:

1. A tilt sensor; comprising:
   (a) mounting means;
   (b) pedestal means secured to and extending from said mounting means;
   (c) level sensor means secured to said pedestal means and having an exterior surface;
   (d) thermal shunt means dispsosed about and in close proximity to said level sensor means and urged into close contact with said exterior surface of said level sensor means;
   (e) said level sensor means containing a fluid electrolyte disposed therewithin to form a bubble of predetermined size and configuration and which is disposed at a predetermined location therewithin when the tilt sensor is in a predetermined position with respect to a given reference;
   (f) said level sensor means further including conductive means suitably connected to said level sensor means for providing an output signal indicative of movement of said level sensor means with respect to said given reference.

2. The tilt sensor of claim 1, wherein said thermal shunt means is held in close proximity to said exterior surface of said level sensor means by encapsulating means shrunk fit about said thermal shunt means and said level sensor means.

3. The tilt sensor of claim 2, wherein said thermal shunt means is formed from a tube of flexible copper braid.

4. The tilt sensor of claim 3, wherein said encapsulating means is a platic material shrunk fit around said thermal shunt means.

5. The tilt sensor of claim 1 wherein: pedestal positioning means are formed in said mounting means; said pedestal positioning means including seat means coacting with an exterior surface of said pedestal means to provide predetermined places-of-contact between said pedestal means and said seat means.

6. The tilt sensor of claim 5, wherein securing means urge said pedestal means against said places-of-contact.

7. The tilt sensor of claim 6, wherein said seat means is formed as a "v" type block and said places-of-contact are points-of-contact.

8. The tilt sensor of claim 7, wherein affixing means further secure said pedestal means to said mounting means.

9. The tilt sensor of claim 8, wherein said affixing means is an epoxy applied between said pedestal means and said positioning means except at said points-of-contact.

10. The tilt sensor of claim 9, wherein said pedestal means is formed with sensor mounting means and securing means secure said level sensor means thereto.

11. The tilt sensor of claim 10, wherein said pedestal means is formed from ceramic material and includes a plurality of spaced posts of a size and configuration to receive said level sensor means, and said level sensor securing means securing said level sensor means to said posts.

12. The tilt sensor of claim 11, wherein said level sensor securing means is an epoxy applied about the periphery of each of said posts to secure said level sensor means thereto so that no epoxy is disposed between said level sensor means and said posts except about the periphery of each of said posts.

13. The tilt sensor of claim 12, wherein said level sensor means is secured to said pedestal means so that said conductor means are symetrically spaced with respect thereto.

14. The tilt sensor of claim 13, including housing means connected to said mounting means and disposed about said pedestal means and level sensor means, and plastic insulating means filling any space within said housing means and about said pedestal means and level sensor means.

15. The method of fabricating and assembling a tilt sensor; comprising:
   (a) providing level sensor means in the form of a glass container enclosing an electrolytic fluid disposed about a bubble of predetermined size configuration and disposition, and within which there are disposed a plurality of spaced electrodes;
   (b) forming a mounting pedestal from ceramic material and with a plurality of spaced sensor mounting posts;
   (c) positioning said glass container upon said posts and so that said spaced electrodes are symetrically disposed with respect thereto;

(d) affixing said glass container to said posts by applying an epoxy only about the periphery of each of said posts where they touch said glass container;
(e) providing a thermal shunt;
(f) encapsulating said thermal shunt about said glass container;
(g) forming a mounting plate;
(h) forming pedestal receiving means on said mounting plate; and
(i) securing said mounting pedestal to said mounting plate.

16. The method of fabricating and assembling the tilt sensor of claim 15, wherein said thermal shunt is formed from a tube of flexible braided copper and is encapsulated about said glass container by enclosing same in a plastic tube means of heat shrinkable thermosetting plastic and heat shrinking same thereabout.

17. The method of claim 16, wherein said pedestal receiving means is formed to include a "v" block type seat and spring pin means are provided to urge an exterior surface of said mounting pedestal against said "v" block seat to provide points-of-contact therebetween, and said mounting pedestal is secured in position by applying an epoxy to an exterior surface of said mounting pedestal and said pedestal receiving means but not at said points-of-contact.

18. The method of claim 17, including providing a housing about said mounting pedestal and level sensor means, filling spaces within said housing with plastic insulation and securing said housing to said mounting plate.

* * * * *